Feb. 7, 1933.  J. W. SAILLER  1,896,974

WHEEL BALANCING

Filed Oct. 10, 1930

INVENTOR
JOHN W. SAILLER.
BY
ATTORNEY

Patented Feb. 7, 1933

1,896,974

UNITED STATES PATENT OFFICE

JOHN W. SAILLER, OF DETROIT, MICHIGAN, ASSIGNOR TO CHRYSLER CORPORATION, OF DETROIT, MICHIGAN, A CORPORATION OF DELAWARE

WHEEL BALANCING

Application filed October 10, 1930. Serial No. 487,647.

The main objects of this invention are to provide improved means for balancing the out of balanced portions of vehicle wheels; to provide means of this kind which are particularly adapted for use on vehicle wheels having metal spokes; to provide balancing members which are adapted to be secured on the inner periphery of a wheel felly by a single attaching member; and to provide members of this kind which have an end portion that is formed so as to receive a protuberance on the felly which serves as a socket for the threaded heads of the spokes.

An illustrative embodiment of the invention is shown in the accompanying drawing, in which.

Figure 1:
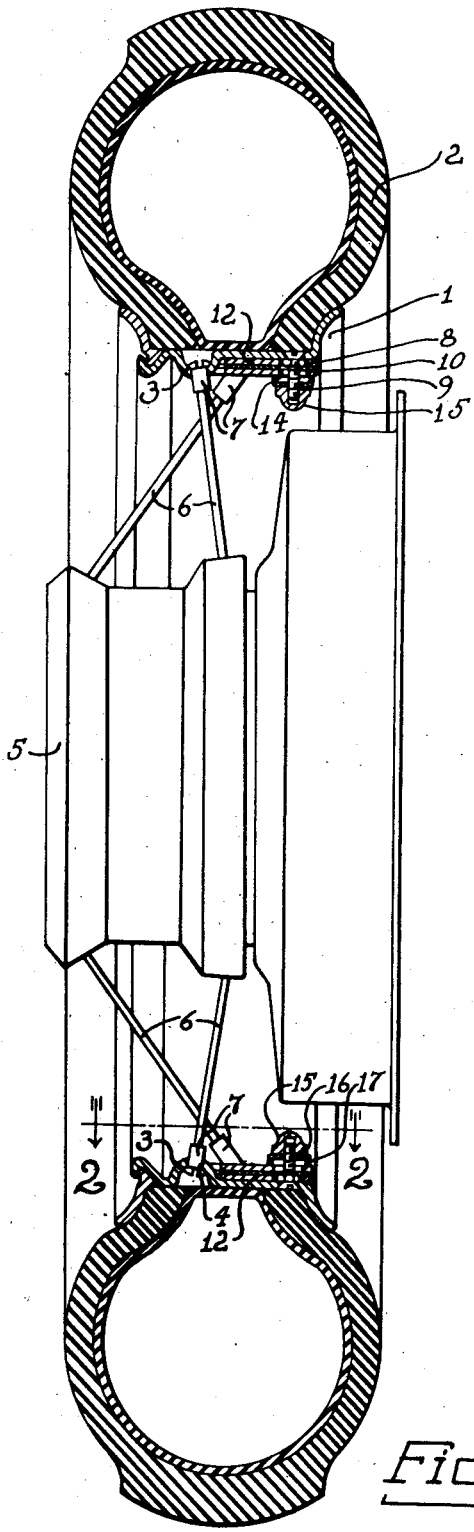
Fig. 1 is a vertical section of a vehicle wheel embodying my invention.
Figure 2:
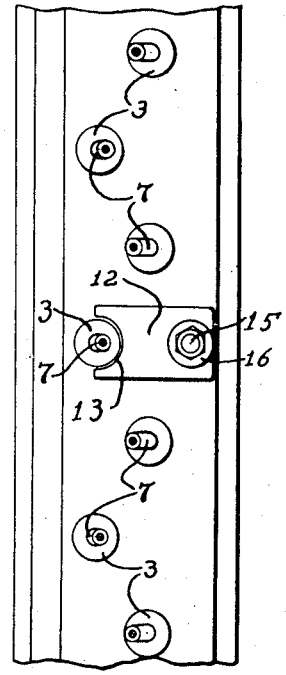
Fig. 2 is a fragmentary plan view of the inner periphery of the felly of the wheel.
Figure 3:
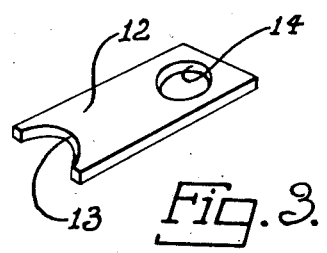
Fig. 3 is a perspective view showing a balancing weight in detail.

In the form shown, my improved weights for balancing out of balanced portions of a wheel are illustrated in connection with a vehicle wheel which includes an outer rim or felly 1 on which a pneumatic tire 2 is mounted. The inner periphery of the felly is provided with a plurality of staggered, hollow protuberances 3 which have apertures 4 at their inner extremities. The wheel has a hub 5 which is held in concentric spaced relation to the felly by spokes 6 having threaded head portions 7 extending partly through the apertures 4 of the protuberances, the enlarged outer extremities of the head portions 7 being seated in the concave sides of the protuberances.

The rim of the wheel is provided with apertures 8 located in related proximity to the protuberances 3 in which screw head bolts 9 are mounted. The bolts are firmly secured to the rim 1 by nuts 10 which are located adjacent the inner periphery of the rim.

Weights 12 comprising flat metal bars are provided for balancing the out of balanced portions of the wheel. These weights have semi-circular notched extremities 13 which are adapted to embrace the protuberances of the rim 1 and they have apertures 14 which register with the bolts 9. In balancing a wheel, the location of the out of balance mass is first determined and then its effect is neutralized by placing the members 12 of suitable weight adjacent the inner periphery of the rim in the manner shown in Fig. 1. Several weights may be arranged in superimposed relation and conveniently mounted on the rim by placing the notched ends 13 of the weights in registration with a protuberance 3 of the rim and engaging the apertured ends of the weights on a bolt 9. The weights may then be firmly clamped upon the inner periphery of the rim 1 by screwing the nuts 15 tightly upon the cup-shaped washer 16 which has a peripheral flange 17 engaging the upper surface of one of the weights around the aperture 14 therein. In this manner, weights of various magnitudes may be conveniently mounted on the inner periphery of the rim 1 and secured against movement relative thereto by a single fastening member.

Although but one specific embodiment of this invention has herein been shown and described, it will be understood that various changes in the size, shape and arrangement of parts may be made without departing from the spirit of my invention and it is not my intention to limit its scope other than by the terms of the appended claim.

What I claim is:

In a vehicle wheel and tire assembly, a rim having a channel in its outer periphery, a tire including an outer casing having bead portions adjacent the sides of said channel and having an inner tube extending between said bead portions at the intermediate part of said rim, inwardly extending protuberances on the inner periphery of said rim, a hub, spokes connecting said rim and hub, each having a head portion seated in one of said protuberances and extending therethrough, weights on the inner periphery of said rim for balancing the out of balanced portions of said wheel, each having a notched extremity for embracing one of said protuberances and having edge portions engageable with said protuberances for holding the notched extremities of said weights against displacement and means extending through apertures in said weights and rim and registering with a bead portion of said casing for firmly clamping said weights together and to said rim.

JOHN W. SAILLER.